Aug. 15, 1961 E. HÄNY 2,996,568
GAS TIGHT ELECTRIC CONDUCTOR MOUNTING
Filed Nov. 23, 1959
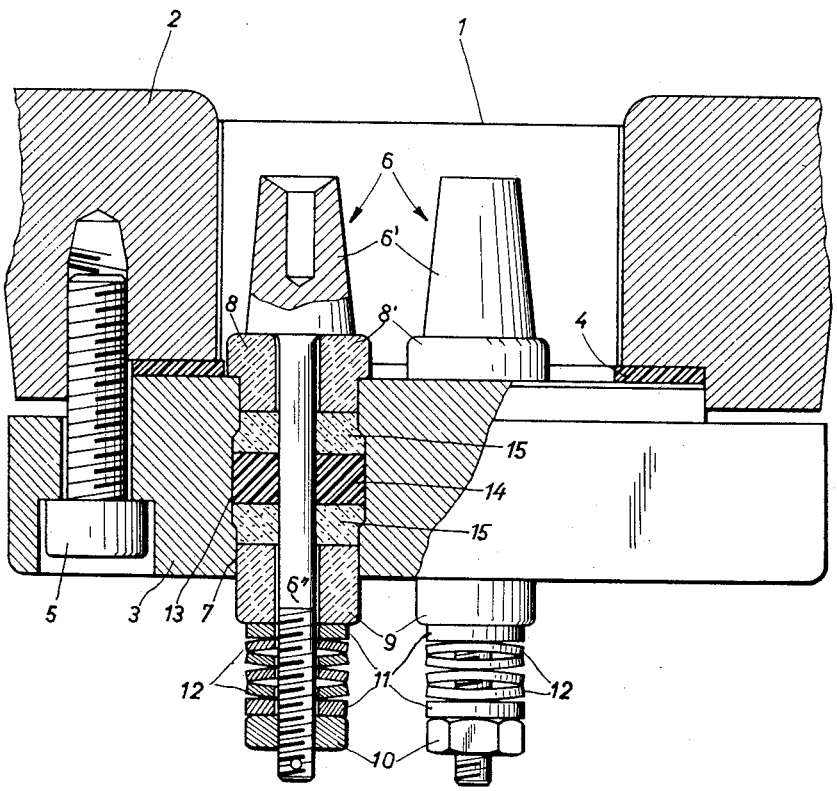
INVENTOR
EDUARD HÄNY

2,996,568
GAS TIGHT ELECTRIC CONDUCTOR MOUNTING

Eduard Häny, Meilen, Switzerland, assignor to
Häny & Cie, Meilen, Switzerland
Filed Nov. 23, 1959, Ser. No. 854,945
Claims priority, application Germany Nov. 28, 1958
2 Claims. (Cl. 174—152)

The invention relates to terminal connections and more particularly to a conductor bolt leading through a wall which is liquid- and gastight and separates two fluid media between which there exists a temperature and/or pressure difference. The invention relates especially to electro-motors sealed in a housing which is filled with a medium.

Such conductor bolts are subject to strict requirements if they are e.g. in use on electro-motors of circulation pumps for fluids at a high pressure and media having a high temperature. Naturally, conductor bolts have to be firmly fixed in the wall and securely insulated. Their packing has to be absolutely liquid- and gastight, no matter if there is pressure or vacuum acting on it. The packing material has to be extremely resistant to high temperatures, and the design has to be such as to prevent any alterations of the insulation, of the density of the material or the sealing effect under the influence of possible considerable variations of temperatures.

In a known conductor bolt arrangement, for instance, moulded articles made of insulating packing material, preferably rubber, are used. Such expensive moulded articles actually can be used only at low temperatures or pressures. A certain progress was presented by another suggestion, according to which the moulded articles, which must not only insulate and seal the conductor bolt but also hold the latter in firmly fixed position, were replaced by an insulating and sealing substance, e.g. in form of powder or fibres. This substance has then been filled into the space surrounding the conductor bolt and compressed, whereby a moulded body has been formed which conforms to the profile of the conductor bolt. However, conductor bolts of the described kind could also not completely meet all requirements therefor, mainly with respect to requirements concerning their sealing effect.

A conductor bolt arrangement according to the invention including an electrode leading through a passage in a wall which separates two fluid media between which there is a temperature and/or pressure difference, particularly for electromotors sealed within a fluid medium filled housing, comprises a sealing ring of malleable material surrounding the electrode and arranged in the conductor bolt passage in tight engagement with the wall of the passage, a loose electrically insulating material being packed into said conductor passage on both sides of the sealing ring, and pressure members being mounted on the electrode to exert pressure on said sealing ring through said loose insulating material.

The accompanying drawing illustrates an embodiment of the invention. The single figure represents a sectional view of a portion of a motor housing with a conductor bolt arrangement according to the invention. In the drawing, the casing 2 of an electro-motor, not shown, is provided with an opening 1 for the current leads to the motor which for instance drives a circulation pump for a hot fluid medium under pressure. In this connection it should be noted that the medium pressure may be in the order of magnitude of some tenths of one atm. and the temperature over 300° C. may prevail and that the medium is present in the motor casing.

The lead inlet 1 is closed by a cover 3 which together with a packing ring 4 is bolted to the casing 2 by means of the screws 5.

The current phases are lead into the casing by means of conductor bolt arrangements extending through the cover 3, one of the bolts being visible in section. For each phase there is provided an electrode 6 having a head 6' at the inner end and a threaded shaft 6" projecting through the duct 7 in the cover 3 to the outside. The shaft 6" is guided in bushings 8 and 9 made of an insulating material, such as ceramic or quartz. The bushings 8 and 9 themselves are guided by the ends of the duct 7 into which they are partly inserted. The bushing 8 which is on the inner side of the cover 3, has a collar 8' on which bears the head 6' of the bolt 6. The collar 8' itself bears on the cover 3. The bushing 9, however, has only one outside diameter over its whole length and can be forced into the duct 7 by means of pressure exerting means in the form of a nut 10 provided on the threaded shaft end 6". Between the nut 10 and the bushing 9 there is disposed a package of prestressed plate springs 12 with washers 11 on each side of the package, said springs 12 and washers 11 also forming part of the pressure exerting means.

The duct or passage 7 in the cover 3 is provided with a turned out recess 13 intermediate its ends, so that the passage includes a central portion of greater diameter than the two end portions.

A sealing ring or plug 14 is arranged in the enlarged portion 13 of the passage, this plug being made of a ductile or malleable electrically insulating material surrounding the shaft 6" of the bolt 6, and fitting tightly against the wall of the duct. Preferably, a plastic substance, such as for instance the material which commercially known under the trade name "Teflon" is used for said ring. On both sides of the ring 14 the remaining space of the duct is filled with loose particles of an electrically insulating material 15. For this purpose, substances, e.g. soapstone powder, mica powder, absestos- or glass fibres and the like are preferably used.

When the nut 10 is tightened, pressure is exerted by the intermediary of the springs 12, the bushing 9 and the loose material 15 on the sealing ring 14. The ring 14 is compressed and forced against the walls of the duct 7 and against the electrode shaft 6", so that the duct 7 is perfectly sealed along its wall and along the shaft 6". Due to the pressing of the ring 14 into the enlarged portion 13 of the duct 7, a bulge is produced in the moulded body formed by the compressed packing material 15. This bulge determines clearly the position of said body, of the ring 14 and of the bolt in the duct. In order to prevent a straining of the material 15 due to the pressure within the housing 2, it is of advantage to bring the collar 8' of the bushing 8 in close contact with the cover 3, before the nut 10 is tightened. For the same reason, the bushings 8 and 9 are preferably interchanged, if there is a vacuum instead of a pressure inside of the housing. But, if the pressure difference between the two sides of the cover 3 is small, the bushing 8 does not necessarily require a collar 8'.

It must be noted that the plate springs 12 are only tensioned by the nut 10, but not pressed flat. In this manner, provision is made for permitting expansion of the material caused by changes in temperature; this is accomplished without it being necessary to limit the necessary degree of compression for the packing material 14 to assure a perfect sealing.

In order to connect the motor windings to the electrodes 6, the heads 6" are provided with an axial hole into which the conductor ends may be soldered. To connect the power supply conductors, the threaded shafts 6" may be used.

The described conductor bolt arrangement in which the electrodes are made of stainless steel, is permanently tight under all operating conditions and also prevents a loosening of the bolts when vibrations occur. The described duct bolt arrangement also prevents a change in the electrical or mechanical properties and is inexpensive to manufacture.

I claim:
1. A conductor bolt arrangement comprising an electrode, a wall of a housing adapted to be filled with a fluid having a high pressure and temperature, particularly for electro-motors sealed in a housing filled with a gaseous madium, said wall having a passage therethrough through which said electrode extends, a sealing ring of malleable electric-insulating material surrounding the electrode and positioned in said passage in tight engagement with the wall of the passage, heat insulating bushings on both sides of the sealing ring consisting of discrete particles of electric-insulating material packed into said duct passage, rigid pressing bushings bearing on the ends of said heat insulating bushings remote from said sealing ring, and pressure exerting means mounted on the electrode and bearing against said rigid pressing bushings, whereby said discrete particles are tightly packed and bear against said sealing ring and act as rigidly behaving bodies and also seal against the periphery of the electrode and said passage.

2. A conductor bolt arrangement as claimed in claim 1 in which said passage has a portion substantially midway of the length thereof of larger diameter than the remainder of said passage, and said sealing ring has substantially the same diameter as said enlarged portion.

References Cited in the file of this patent

UNITED STATES PATENTS

| | | |
|---|---|---|
| 1,731,597 | Spear | Oct. 15, 1929 |
| 1,857,614 | Backer | May 10, 1932 |
| 2,425,404 | Touborg | Aug. 12, 1947 |
| 2,898,396 | Watson | Aug. 4, 1959 |